United States Patent Office 2,821,289
Patented Jan. 28, 1958

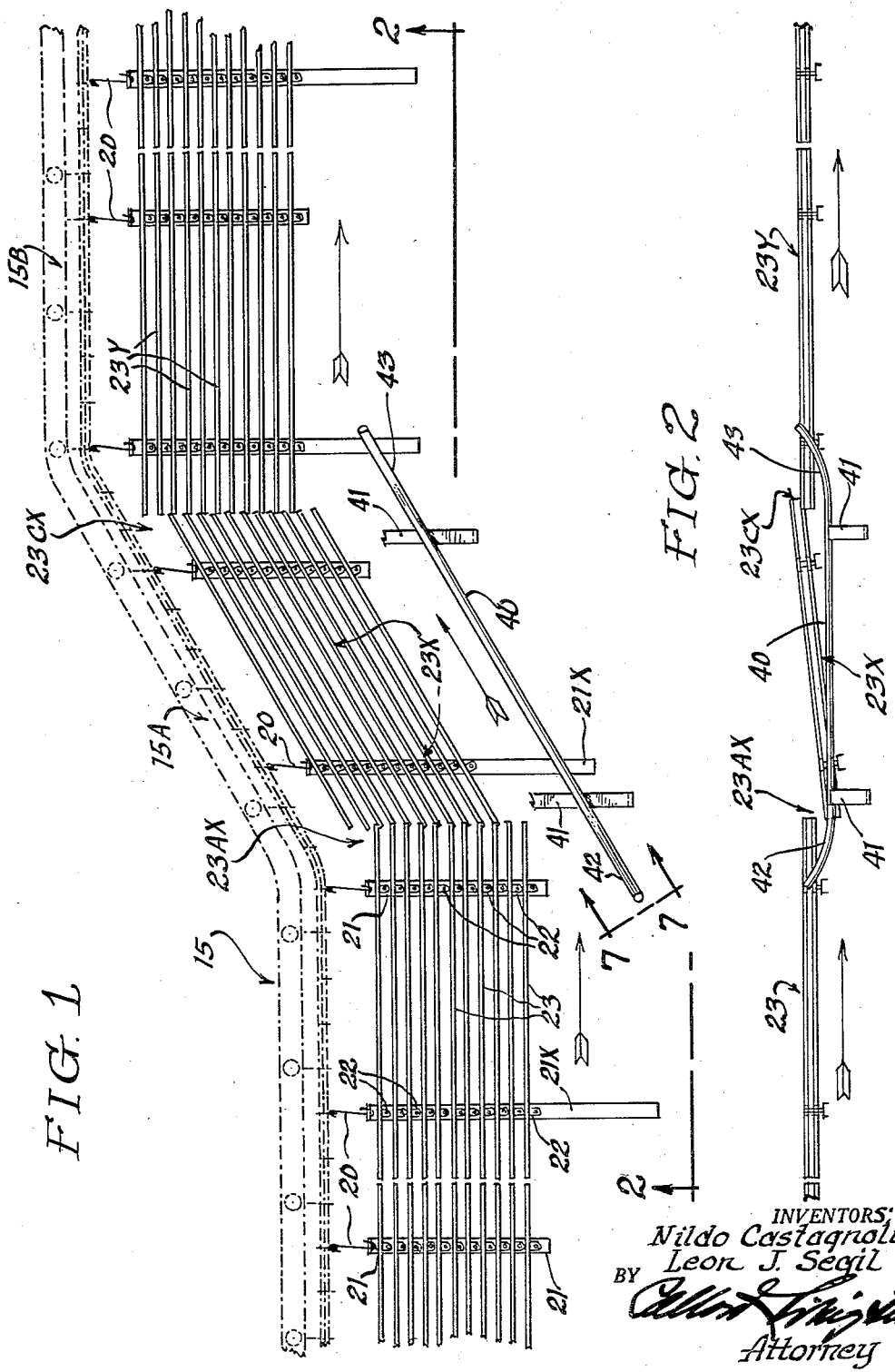

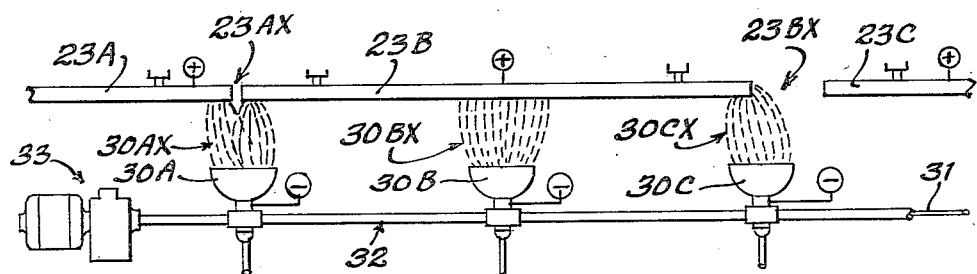
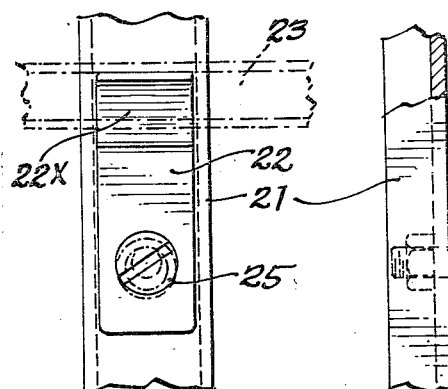
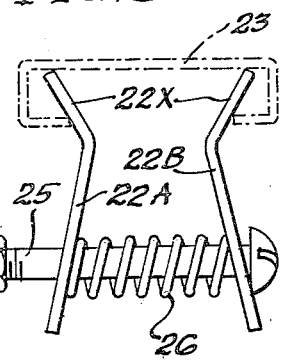
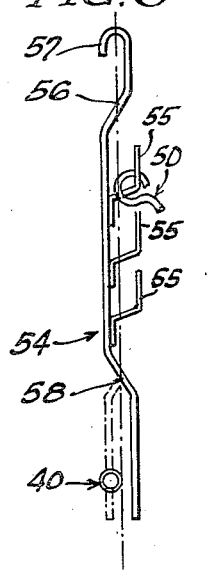
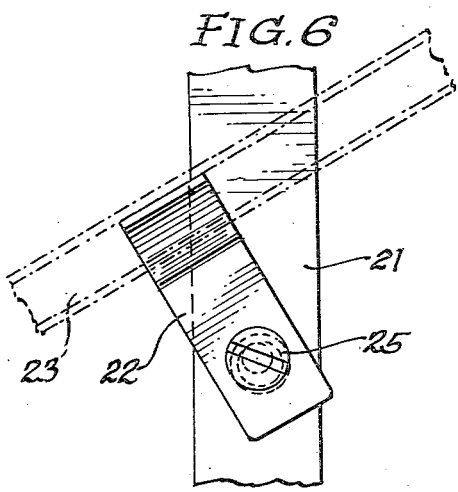
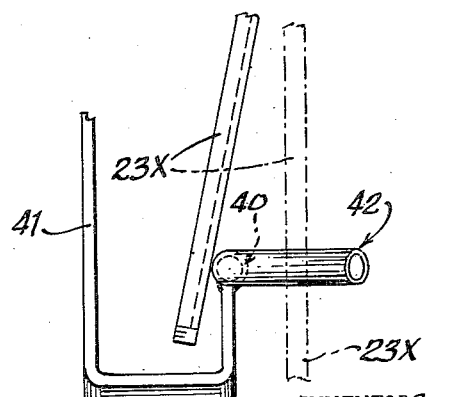

2,821,289

ANTI-COLLISION CONVEYOR MEANS

Nildo Castagnoli, Stone Park, and Leon J. Segil, Winnetka, Ill., assignors to Luminous Ceilings, Inc., Chicago, Ill., a corporation of Illinois Application August 8, 1955, Serial No. 526,905

7 Claims. (Cl. 198—177)

This invention pertains to improvements in conveyors, especially for use in the art of electrostatic deposition of paints and the like, wherein objects to be sprayed with paint, for example, are given a high electrostatic charge and exposed to dispersal of paint from a source which is oppositely charged so that the paint is attracted to, and deposited upon, the object.

In production spraying, the objects to be sprayed are commonly transported by a conveying means, usually of the overhead type, past one or more electrostatic spray heads with appropriate charges applied to the travelling objects as they approach the spray heads.

It is required for many types of objects, for example elongated members having thin edges, that they be as close together as possible, since otherwise a space separating any two succeeding objects would cause the dispersion of paint to be attracted to the two ends thereof in excessive amounts with an objectionable pile-up of paint on the ends.

The present invention has as its principal object the provision of a simple offsetting guide or deflection means in a conveyor system of the class described, making it possible to carry objects of critical shape or dimension in close succession and nearly touching proximity for travel along an irregular conveying path without collision at points of inflection or change in the line of travel, for instance when climbing or descending from one floor level to another.

Another object is the provision of hanger means on which the transported objects are mounted to be deflected or not by the offsetting guide, as required.

More detailed objects and aspects of novelty and utility inherent in the disclosed embodiment will appear as the following description proceeds in view of the annexed drawings, in which:

Fig. 1 is an elevational view along a conveyor section involving a change of direction;

Fig. 2 is a plan view looking up along lines 2—2 of Fig. 1;

Fig. 3 is a plan view looking down at a spraying station;

Fig. 4 is a highly magnified, fragmentary front elevational view of one of the pivoted supporting cleats on a conveyor tree;

Fig. 5 is a fragmentary and magnified view showing a side elevation of the cleat of Fig. 4;

Fig. 6 is a view similar to that of Fig. 4 but showing the cleat in pivoted condition;

Fig. 7 is an enlarged fragmentary detail of the conveyor offsetting means looking in the direction of lines 7—7 of Fig. 1;

Fig. 8 is a front view of another type of hanger bar for small objects.

In Fig. 1 there is depicted a monorail type overhead chain conveyor 15 with an inclined section 15A levelling off in an upper run or span 15B, such as might commonly be encountered in passing from one floor level to a higher one, it being understood that such conveyor ordinarily would operate continuously over a circuitous path, and in the course of travel might change direction numerous times both in the horizontal and vertical senses.

Suspended at intervals from the conveyor chain are hooks 20, from which depend hanger bars 21 each having a plurality of uniformly, vertically spaced, pivotable spring clips 22 respectively engaging elongated metal strips or slats 23 in the manner more particularly illustrated in Figs. 4 to 6, wherein it will be seen, referring especially to Fig. 5, the bolts 25 are fixed in the bars and the clips consist of pairs of gripper levers 22A, 22B freely turning on the bolts and diverged by a spring 26 so that the offset upper ends 22X thereof tend to spread away from each other and grip the object 23 to be transported, these clips being free to rock, as illustrated in Fig. 6, in order to permit the objects 23 to assume the inclined attitude shown at 23X in Fig. 1.

Referring now to the purely schematic depiction of Fig. 3, the elongated slats 23 may be assumed to be travelling past an electrostatic "spraying" station consisting of rotating, metallic bells 30A, 30B, 30C, which are usually rotated from a shaft means 31 within a conduit 32 and driven by a motor and gear means 33, each spray bell or head having a connection 34 with a source of supply of the paint to be sprayed.

The electrostatic spraying apparatus 30, 31, 32, 33, etc. forms no part of the invention, and various forms of such equipment may be employed as desired.

In Fig. 3, it is important to observe that the elongated objects 23 which are to be sprayed are not spaced the same distance apart in their succession on the conveyor. For instance, at 23AX the tandem objects 23A, 23B are illustrated to indicate a proper spacing in closely following relation for satisfactory spraying, whereas at 23BX a much wider spacing is depicted between the objects 23B and 23C.

The dispersal of the paint from the bell at station 30A will be substantially as shown at 30AX with a uniform electrostatic dispersal moving more or less evenly toward both ends of the objects 23 at the spacing 23AX. Similarly, the dispersal at the intermediate spray station 30B (if in use) would be approximately as depicted at 30BX.

However, the spray indicated at 30CX from the last station at bell 30C would be predominantly toward the end of only one set of the objects 23 at the wide spacing 23BX, because there is nothing in between the succeeding ends of the set 23B and the widely spaced ends of the set of objects 23C to attract the charged particles of paint, and the latter will tend to pile up on the charged ends which are closest to the bell or spray at any given instant, resulting in an unacceptable paint finish.

Thus, the condition at 23BX (Fig. 3) which obtains when the narrow objects are spaced too far apart in succession requires that the closest possible spacing be employed if the paint is to be uniformly applied; but when this is done in connection with any conveyor which materially alters its direction of travel, up and down particularly, the confronting ends of the objects will collide with resulting damage to the objects or the finish thereon, and possibly even to personnel.

The condition of actual collision is not illustrated, but the possibility will become apparent by reference to Fig. 1, at points 23AX, 23CX, where the change of angular position of the objects 23X would result in collision were it not for the provisions of the present invention, namely, a deflecting of the inclined objects 23X sidewise out of the plane of vertical alignment of the other transported objects in the preceding set 23Y, or the succeeding set 23, in the manner especially depicted in Fig. 2.

Means for deflecting the transported objects in a certain manner at critical positions along the route of travel (as shown in Fig. 1) includes an elongated guide bar or deflector 40 mounted on suitable brackets 41 which in turn may be attached to an adjacent wall or pendant from the ceiling or other structure along the route of travel.

In the form illustrated in Figs. 2 and 7, the bar 40 is in the form of a length of pipe which is straight along the major portion of its span, but which is curved at both ends 42, 43, the curvatures being kept substantially in the plane of said major span and being to right or left, depending upon which side of the line of travel the conveyed objects are to be deflected, this being, in turn, usually determined by the proximity of an adjacent wall or other objects which lie along the route.

It will be observed in Fig. 1 that the conveyor hanger rods 21X all have a deeper or longer foot than their respective companion bars, that is to say, the trailing hanger bars are longer than their accompanying lead bars, the additional length being calculated to project down beyond the level of the deflector bars 40 and their appertaining curved end portions, with the result that as said elongated foot portions engage the near offset or curve 42 the entire section (e. g. the set 23X, Figs. 1 and 2) will be swung askew in a crosswise sense out of alignment with the preceding and succeeding sets.

Thus, in Fig. 2, at the separation interval or space 23AX the trailing end of the set 23X is clearly out of alignment, and free from danger of collision with the leading end of the following set 23, the relative amount of the deflection being indicated to larger scale in Fig. 7. Likewise, the leading end of the set 23X is deflected from danger of collision with the trailing end of the set 23Y in the region of the interval at 23CX.

Upon reaching the end of the irregular or dangerous part of the run, which on the example shown would be the rise from the lower levels occupied by the section 23 to the upper level occupied by the section 23Y (the same being spanned by the deflector means 40, 41, 42), the transported sets or objects will simply gravitate back into the normal vertical plane of travel, that is to the position occupied by the set at 23Y (Fig. 2).

It is to be understood that objects other than the elongated, slat-like members 23 will be transported in such a system, such other objects commonly being of a great range of size and shape; and such objects may from time to time be interspersed with groups of other objects, such as the elongated pieces illustrated in Figs. 1 and 2.

For instance, relatively small pieces, such as the lamp fixture parts 50 (Fig. 8) made of 3/16-inch tubing, may be sprayed and, since objects of this shape and size do not present any spacing problem, they can be suspended on single hanger rods 54 having simple pegs 55 projecting therefrom, and such rods can follow close together.

However, since the individual hanger rods 54 must traverse the same route as the critical objects and there is no necessity for deflecting the same, the individual non-deflectable hangers are contrived to be unaffected by the deflecting means 40—41—42 so that they will rest at all times in substantially the one vertical plane of travel, and this is achieved by providing upper and lower offsets 56 and 58 which are in substantial vertical alignment with the hanging center of the suspension hook part 57 of this type of hanger rod, the center of gravity of such rods being kept within such vertical alignment center so that the rods hang straight whether loaded or unloaded.

A feature of the so-called non-deflection hanger rods 54 is that they can be made deflectable simply by reversing their hanging positions from the full-line position (Fig. 8) to the dotted-line position, so that the offset foot will miss the guide or deflecting rail 40 in the full-line position, but not in the dotted-line or deflecting position.

This selective deflecting character of the rod of Fig. 8 may be applied to other types of hanger including those to be used in pairs or sets, such as shown in Fig. 1, it being the characteristic of such "selective deflection" hangers that they have a foot or contact leg which is offset from the vertical or hanging center line an amount related to the offsetting of the upper hanging or attaching means or hook 57 to cause the rod, loaded or unloaded, to hang straight and to locate said foot at one side and free of the stationary deflector means when the rod is turned to one hand, right or left, or to dispose the foot in the way of the deflector means when the rod is turned to the other hand.

We claim:

1. In an overhead monorail conveying system for carrying pendant hanger rods loaded with objects travelled thereby along a normal path of travel which includes at least one change in level up or down, to another level, improvements in anti-collision means comprising, namely: an elongated deflector member beneath the conveyor along the span traversing the complete change in level and offset from the normal vertical hanging plane occupied by the hanging objects, together with hanger means for supporting said objects and carried by the conveying system, said hanger means including a pendant leg reaching fully to the level of said deflector member to engage the latter and swing the hanger means to one side of said normal path of travel so as to be out of alignment with the plane of travel of both succeeding and preceding conveyed objects for the length of said span.

2. In a conveyor system including pendant carrying means in pairs for supporting carried objects in a normal plane and moved along a route involving a change from level to level, anti-collision means for carried objects having critical horizontal dimensions sufficient to cause engagement of the leading or trailing portions of one such object with another which precedes or follows it at less than a predetermined distance as a result of inclination of the object during transit to a different level, said means comprising a pendant carrying member in each said pair and positioned near the trailing end of such a carried object and having a contact portion at its lowermost extremity adapted to engage a deflecting device; together with a deflecting device located along said route at a level and in a plane beginning close to the commencement of, extending throughout the length of, that portion of the route occupied by the change in level, said deflecting device being located in relation to the normal pendant line of travel of said contact portion of the carrying member to cause the latter, and hence the trailing and leading parts, of the carried object, to be swung laterally out of its normally pendant plane of travel and into a deflected plane which is out of alignment with the normally pendant plane of travel of a preceding or succeeding object of the critical dimension described.

3. In a conveyor system having an overhead travelling means passing through at least one change in level from lower to higher or vice versa, anti-collision hanger rods in pairs having an attaching means near the upper ends thereof for swinging engagement with said travelling means so as to hang and travel in tandem in a certain normal plane of travel, said rods having supporting means thereon for engagement with an elongated object extending therebetween and jointly supported thereby to travel in a substantially horizontal condition in said normal plane and which are of a length to tilt in said plane during transit through said change in level, deflector means in the form of an elongated member situated at a predetermined level beneath the line of travel of said leading rod so as not to be engaged by the latter, said elongated deflector member also extending the length of said change in level as determined by the extent of travel during which said carried object is in the tilted condition aforesaid, the trailing one of said rods having a lower extension constituting a deflecting leg disposed at a level and in a plane of travel to engage and slide along said deflector member and be swung laterally by the latter to swing the appertaining carrying rod substantially out of said normal plane of travel and with it the parts of the carried object supported thereby, so that the said objects are out of alignment with said plane and the adjacent parts of tandem moving objects which are travelling in said normal plane.

4. In a conveying system of the variety including an overhead travelling means adapted to carry objects on pendant carrying members suspended therefrom along a route of travel involving at least one change in level, sub-combination improvements comprising: deflector means disposed along that portion of said route occupied by said change in level and including means providing continuous deflecting surface disposed in a certain vertical plane paralleling the normal plane of travel of said pendant carrying members, together with an elongated anti-collision carrying member having means at its upper end to swingably engage said overhead travelling means and also having deflector contacting means at its lower end portion positioned to slidably engage said continuous surface and so situated relative to said normal plane of travel as to be swung laterally a substantial amount out of said plane for the duration of its travel along said deflecting surface, whereby those portions of an object carried by said anti-collision member will be maintained out of alignment with portions of another adjacent conveyed object which is disposed in said normal plane at less than a predetermined distance from said offset portions and which also has a predetermined minimum horizontal length measured in said normal plane.

5. That subcombination of claim 4, further characterized by the provision of additional carrying members having said swingable attaching means and said deflector contacting means both laterally offset in the same direction from the line of said normal plane of travel by an amount which will cause said deflecting portion to miss and not engage said continuous surface when the carrying member is suspended from said travelling means on that side of said normal plane of travel which is away from said continuous surface, but which will deflectingly engage said surface when the carrying member is suspended with said offset contacting portion disposed on that side of said normal plane which is toward said continuous surface, whereby said carrying member will be deflected or not depending upon which of said two conditions of suspension is occupied thereby.

6. In an overhead conveyor system for transporting objects following one close upon another in pendant condition from one level to another through an intermediate zone of inclination such that the trailing portions of a leading object are in danger of touching leading portions of the object immediately following as a result of the leading object changing inclination in said intermediate zone, means for preventing such touching comprising, to wit: an elongated deflector positioned in substantially the same vertical plane as one containing said pendant transported objects approaching and departing said zone, said deflector being located in the zone of inclination between levels as aforesaid and at a level below the transported objects in said zone to extend substantially the distance of inclined travel of said objects, said deflector being located at a level below the bottom of such objects and having an offset portion at the beginning part of the deflector approached by the transported objects; and hanger means transported by said conveyor system in pendant condition and having means thereon for supported objects to be transported, said hanger means having a pendant deflector-engaging portion extending down to the level of said deflector to advance upon said offset portion and engage the deflector and swing said hanger means laterally of the normal plane of pendant travel of said hanger means through said zone.

7. In combination with an overhead conveying system having a travelling carrier means with hanger means adapted to transport objects pendantly and seriatum in a normal plane along a route having at least one change from higher to lower level or vice versa: means for throwing any of the carried objects out of its normal plane of travel and alignment in relation to any immediately preceding and following objects during transport through said change in level, said means comprising, namely: deflecting means situated in fixed position along that portion of said route corresponding to the distance travelled by said objects in passing through said change in level, and located in a position relative to the carrier and hanger means so as normally not to be engaged by said hanger means or objects carried thereby; together with deflectable hanger means in the form of an elongated member having attachment means at its upper end for pendantly and swingably engaging with said carrier means; means below said upper end for supportably engaging objects to be carried; and deflector-engaging means at the lower end thereof extended in a direction to engage said deflector means when said hanger attachment means is engaged with the carrier means as aforesaid.

References Cited in the file of this patent

UNITED STATES PATENTS 2,681,015    Davis    June 15, 1954